United States Patent
Wier

(10) Patent No.: US 6,409,212 B1
(45) Date of Patent: Jun. 25, 2002

(54) BELT SYSTEM FOR RESTRAINING A VEHICLE OCCUPANT

(75) Inventor: Franz Wier, Göggingen (DE)

(73) Assignee: TRW Occupant Restraint Systems GmbH & Co. KG, Aldorf (DE)

(*) Notice: Subject to any disclaimer, the term of this patent is extended or adjusted under 35 U.S.C. 154(b) by 0 days.

(21) Appl. No.: 09/448,967

(22) Filed: Nov. 24, 1999

(30) Foreign Application Priority Data

Nov. 27, 1998 (DE) .................................. 298 21 272 U

(51) Int. Cl.⁷ .......................... B60R 21/18; B60R 22/46
(52) U.S. Cl. ........................ 280/733; 280/806; 297/480
(58) Field of Search ..................... 280/733, 801.1, 280/805, 806, 807, 808; 297/468, 470, 471, 480

(56) References Cited

U.S. PATENT DOCUMENTS

| | | | | |
|---|---|---|---|---|
| 5,390,953 A | * | 2/1995 | Tanaka et al. | 280/733 |
| 5,393,091 A | * | 2/1995 | Tanaka et al. | 280/733 |
| 5,553,803 A | * | 9/1996 | Mitzkus et al. | 242/374 |
| 5,634,690 A | * | 6/1997 | Watanabe et al. | 297/480 |
| 5,642,902 A | * | 7/1997 | France | 280/737 |
| 5,676,398 A | * | 10/1997 | Nurtsch | 280/806 |
| 5,829,841 A | * | 11/1998 | Pywell et al. | 297/471 |
| 5,839,753 A | * | 11/1998 | Yaniv et al. | 280/733 |
| 6,168,195 B1 | * | 1/2001 | Okazaki et al. | 280/733 |
| 6,189,921 B1 | * | 2/2001 | Takeuchi | 280/733 |

FOREIGN PATENT DOCUMENTS

| | | |
|---|---|---|
| DE | 4110289 A1 | 10/1992 |
| DE | 4305505 A1 | 9/1993 |
| DE | 4415467 C1 | 11/1995 |
| DE | 297 02 125 U1 * | 7/1997 |
| EP | 0858935 A1 | 8/1998 |

OTHER PUBLICATIONS

German Search Report 298 21 272.2.
Japanese Abstract 6–255447(A).
Japanese Abstract 09086345 A.

* cited by examiner

Primary Examiner—Eric Culbreth
Assistant Examiner—David R. Dunn
(74) Attorney, Agent, or Firm—Tarolli, Sundheim, Covell, Tummino & Szabo L.L.P.

(57) ABSTRACT

The present invention relates to a belt system for restraining a vehicle occupant, comprising a safety belt, a belt buckle, two end fittings, at least one belt retractor, at least one inflatable belt gas bag and at least two belt tensioners. At least one of the belt tensioners is an end fitting tensioner.

13 Claims, 1 Drawing Sheet

BELT SYSTEM FOR RESTRAINING A VEHICLE OCCUPANT

TECHNICAL FIELD

The invention relates to a belt system for restraining a vehicle occupant.

BACKGROUND OF THE INVENTION

Belt systems have been proposed, in which the safety belt is constructed as a tube which is inflated in the case of restraint. Through this tube, a certain tensioning effect is achieved and also a type of damping is made possible on restraining, so that as a whole the risk of injury is reduced. Hitherto, the provision of such inflatable tubes was always directed to replace belt retractors.

BRIEF SUMMARY OF THE INVENTION

The invention provides a belt system which makes possible an even better restraining of the occupant in the case of a crash. This is achieved in a belt system which comprises a safety belt, a belt buckle, two end fittings, at least one belt retractor, at least one inflatable belt gas bag and at least two belt tensioners. At least one of the belt tensioners is an end fitting tensioner. The invention provides, in combination with a belt gas bag, not only one but two tensioners, whereby the tensioning path can be relatively large. In belt gas bags, in fact, the danger would exist that the safety belt and hence the gas bag are displaced too much if only one tensioner with a very long tensioning path were used, which can result in problems with regard to the flow of gas with a simultaneous inflation of the belt gas bag. In addition, for example a retraction tensioner can only have a very small tensioning path when it has to wind up an inflated tube. By providing two tensioners, the position of the gas bag can remain relatively unchanged in the region of the body. The provision of an end fitting tensioner is very crucial here, because an end fitting tensioner, which also includes a retraction tensioner, but not a buckle tensioner, provides for a relatively stable position of the occupant, as has been proved in tests.

Preferably, the end fitting tensioner is a retraction tensioner. Furthermore, two belt retractors can also be provided, which if necessary are both even constructed as retraction tensioners. Thereby, it is possible to completely wind up the safety belt, which has a relatively large volume, when it is constructed as an inflatable tube.

In addition, it is conceivable to combine and end fitting tensioner with a buckle tensioner.

The safety belt can be constructed as an inflatable tube or as an inflatable hollow body fastened to the safety belt.

To inflate the belt gas bag, at least one gas generator is provided, which is arranged fixed to the vehicle. Fixed to the vehicle means that it is fixed to the frame of the vehicle and is not, for instance, arranged on a movable part.

In addition, it is also intended that a gas generator can inflate a plurality of units, namely for example a belt gas bag and at least one tensioner.

DETAILED DESCRIPTION OF PREFERRED EMBODIMENTS

Figure 1:
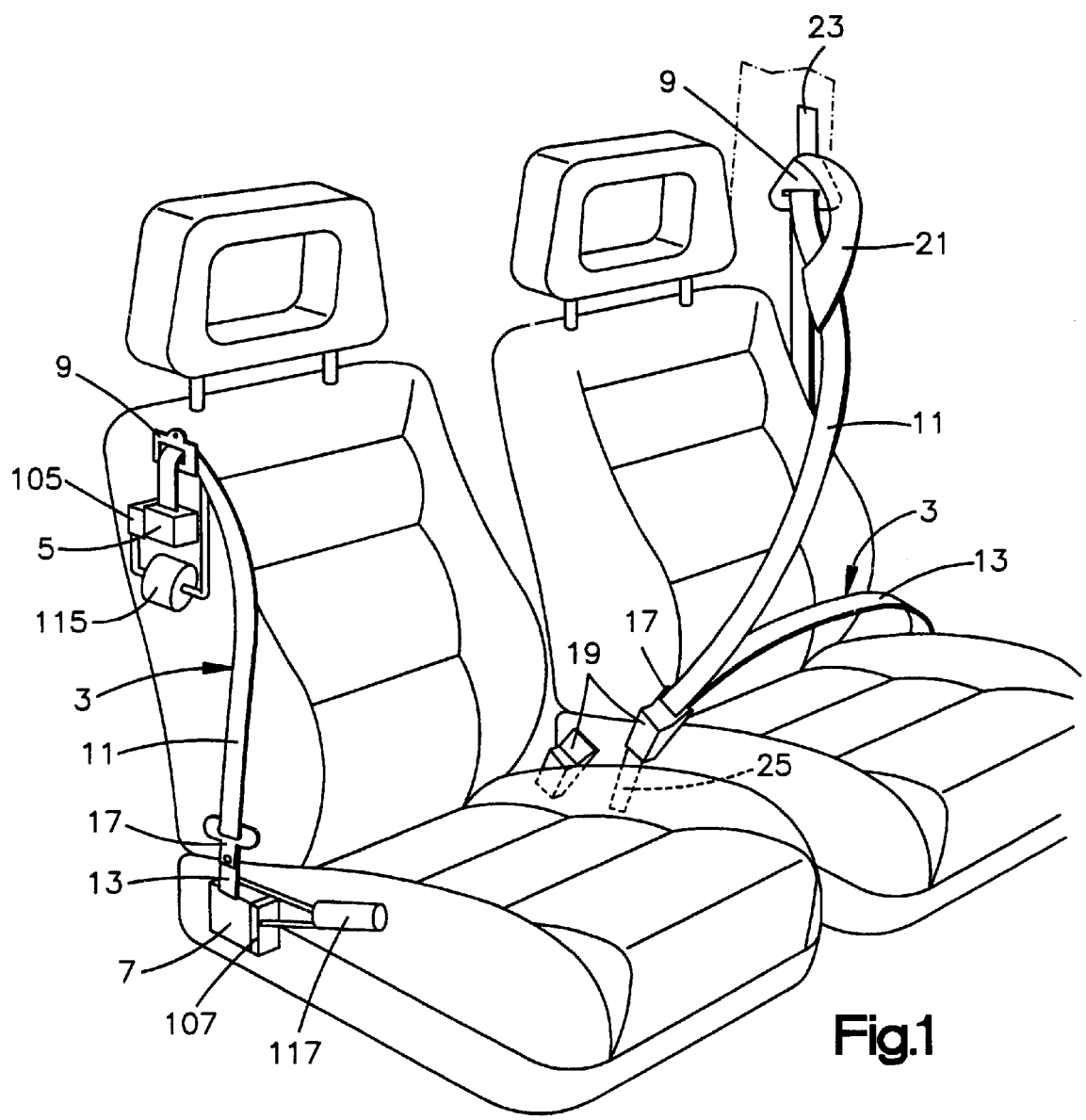
FIG. 1 shows a driver's seat and a passenger's seat, the two seats being equipped with different embodiments of the belt system according to the invention.
Figure 2:
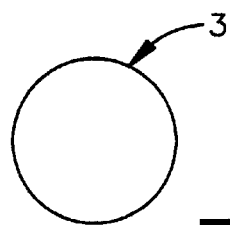
FIG. 2 is a cross-section of the safety belt shown in an inflated condition of the left-hand embodiment of FIG. 1.

The vehicle seats shown in FIG. 1 are each equipped with a belt system for restraining a vehicle occupant. Both belt systems have a three-point safety belt 3 which has two ends.

In the left-hand embodiment, an upper belt retractor 5 and a lower belt retractor 7, which form end fittings, sit at the ends and namely integral with the seat. A deflection fitting at the upper end of the seat is designated by 9. The safety belt 3 has two sections, namely a shoulder belt section 11 and a pelvic belt section 13. The shoulder belt section 11 extends from the deflection fitting 9 up to the insert tongue 17 which can be inserted into a belt buckle 19. Adjoining thereto is the pelvic belt section 13, which extends from the insert tongue 17 up to the lower belt retractor 7. This relates to the state when buckled up. The safety belt is constructed in the manner of a tube, defines a belt gas bag and is folded in the position shown in FIG. 1. Both belt retractors 5, 7 are constructed as retraction tensioners, a special form of end fitting tensioners. Retraction tensioners are known in the art and can be constructed, for example, as described in U.S. Pat. No. 5,553,803 to Mitzkus et al. The tensioner is designated by 105 and 107. For each tensioner 105, 107 an associated gas generator 115 and 117, respectively, is accommodated in the seat. The two gas generators 115, 117, however, have not only a gas connection to the tensioners 105 and 107, respectively, associated with them, but also have ducts which lead into the interior of the tubelike belt 3.

On unwinding of the safety belt, belt webbing is withdrawn from both retractors 5, 7. In the case of restraint, the gas generators 115, 117 inflate the shoulder belt section 11 and the pelvic belt section 13, respectively. In addition, they also actuate the tensioners 105 and 107, respectively, associated with them. Through the inflated belt webbing, on the one hand already a certain tensioning function is produced and on the other hand a damping function is produced, so that when the occupant moves forward, the forces acting on him are reduced. The tensioners 105, 107 likewise additionally eliminate belt slack. The belt system which is shown is distinguished by an extremely good restraining effect both in the pelvic region and also in the shoulder region.

In the right-hand seat, the belt gas bag is not, as in the left-hand embodiment, constructed as a safety belt itself, being hollow, but rather the belt gas bag is an additional body fastened to the deflection fitting 9, which body is mounted at its lower end in a sliding manner on the shoulder belt section 11, by having a loop. The deflection fitting 9 is not fastened to the vehicle seat, but rather to the B-column. Starting from the deflection fitting 9, the belt runs along the B-column downwards to a retraction tensioner which is not shown, which corresponds in an identical manner to the retraction tensioner with the parts 7, 107, 117 according to the embodiment on the left-hand seat and therefore does not have to be further illustrated. However, the gas generator does not have a connection to the interior of the safety belt, because the latter is not hollow in construction. In the belt system on the right-hand seat, a gas generator 23 is integrated in the B-column to inflate the belt gas bag 21. A duct, not shown, leads into the interior of the belt gas bag 21. Since in this embodiment the safety belt 3 is not constructed as a tube and hence has a relatively great thickness, only one retractor is necessary. However, two tensioners are provided, namely on the one hand the retraction tensioner already previously explained and on the other hand a so-called buckle tensioner 25.

When the belt is fastened, the safety belt 3 slides along in the loop of the belt gas bag 21 into the position shown in FIG. 1. The gas bag 21 then extends to the side of the head, starting from the deflection fitting 9 to in front of the left shoulder of the occupant, but slightly more taut than is illustrated in FIG. 1. It extends approximately parallel to the shoulder belt section 21 and therefore does not impede the occupant's vision. In the case of restraint, the buckle tensioner 25 is actuated just as the retraction tensioner. The buckle tensioner draws the belt buckle 19 together with the insert tongue 17 in the arrow section and provides in particular for a tensioning of the pelvic belt section 13. The retraction tensioner provides for a tensioning of the shoulder belt section 11. The gas generator 21 inflates the belt gas bag 21, which unfolds to the side of the occupant's head and prevents the head from a lateral movement, in particular a contact with the B-column or with the side window.

Of course, the two belt systems can also be combined with each other, i.e. for example at least one section of the safety belt is constructed as an inflatable tube and in addition a belt gas bag, as is illustrated in the right-hand seat, is also used.

In both the embodiments shown, it is also important that the gas generators are always arranged fixed to the vehicle and can not perform any relative movement to the vehicle, i.e. to the frame of the vehicle, when the belt is fastened or taken off.

What is claimed is:

1. A belt system for restraining a vehicle occupant, said belt system comprising:
    a safety belt having opposite ends,
    a safety belt deflection fitting located at one end of said safety belt,
    at least one inflatable gas bag associated with safety belt in a manner enabling relative sliding movement of said inflatable gas bag and said safety belt and having an inflated condition and a deflated condition,
    said gas bag being associated with said safety belt by being fastened at one end to the deflection fitting and being fastened at an opposite end to said gas bag after being looped around said safety belt,
    said gas bag, in said inflated condition, being located at an inner side of said safety belt facing towards said vehicle occupant,
    at least two safety belt tensioners, at least one of which being a safety belt end fitting tensioner located at one of said opposite ends of said safety belt,
    said safety belt end fitting tensioner including a safety belt retractor,
    said at least two safety belt tensioners acting to tension said safety belt in opposite respective directions upon inflation of said gas bag to minimize any change in the position of said inflated gas bag along said safety belt.

2. The belt system according to claim 1, wherein said at least two safety belt tensioners are two belt retractors.

3. The belt system according to claim 2, wherein said two belt retractors are constructed as retraction tensioners.

4. The belt system according to claim 1, wherein said other one of said safety belt tensioners is a buckle tensioner.

5. The belt system according to claim 1, wherein said other one of said safety belt tensioners is another end fitting tensioner.

6. The belt system according to claim 1, wherein at least one gas generator is provided to inflate said safety belt gas bag.

7. The belt system according to claim 6, wherein said gas generator is in flow connection with said safety belt gas bag and with at least one safety belt tensioner.

8. The belt system according to claim 1, wherein said inflatable gas bag is constructed as a hollow body.

9. A belt system for restraining a vehicle occupant, said belt system comprising:
    an inflatable safety belt having an inflatable shoulder belt portion in fluid connection with an inflatable pelvic belt portion and having an inflated condition and a deflated condition, said safety belt having opposite ends; and
    a safety belt end fitting tensioner located at each of said opposite ends of said safety belt,
    each of said end fitting tensioners including a safety belt retractor and a gas generator in flow connection with both of said safety belt and said end fitting tensioner,
    each of said gas generators, upon inflation of said inflatable safety belt, providing inflation gas to said safety belt to inflate said shoulder belt portion and said pelvic belt portion and providing gas to each of said end fitting tensioners to tension said safety belt.

10. The belt system according to claim 9, wherein said inflatable safety belt is constructed as an inflatable tube.

11. The belt system according to claim 9, wherein said end fitting tensioners are belt retractors.

12. The belt system according to claim 11, wherein said belt retractors are constructed as retraction tensioners.

13. The belt system according to claim 9, wherein one of said end fitting tensioners is a buckle tensioner.

* * * * *